United States Patent [19]
Chymyck et al.

[11] Patent Number: 5,289,526
[45] Date of Patent: Feb. 22, 1994

[54] CELLULAR SYSTEM ACCESS MONITOR

[75] Inventors: Daryl J. Chymyck; Kurt T. Lemke, both of Palatine, Ill.

[73] Assignee: Safco Corporation, Chicago, Ill.

[21] Appl. No.: 572,666

[22] Filed: Aug. 24, 1990

[51] Int. Cl.$^5$ .................................... H04M 11/00
[52] U.S. Cl. ............................. 379/59; 379/63; 455/67.1
[58] Field of Search .............. 455/33, 67; 379/58, 379/59, 60, 63

[56] References Cited

U.S. PATENT DOCUMENTS

| | | | |
|---|---|---|---|
| 4,680,787 | 7/1987 | Marry | 379/58 |
| 4,810,960 | 3/1989 | Owen et al. | 455/67 |
| 4,920,496 | 4/1990 | Szczebak, Jr. | 455/67 |
| 4,977,399 | 12/1990 | Price et al. | 455/67 |
| 5,008,953 | 4/1991 | Dahlin et al. | 379/60 |
| 5,042,082 | 8/1991 | Dahlin | 455/67 |

FOREIGN PATENT DOCUMENTS

| | | | |
|---|---|---|---|
| 0120136 | 5/1989 | Japan | 455/67 |
| 2178270 | 2/1987 | United Kingdom | 455/67 |

OTHER PUBLICATIONS

AT&T Customer Information Bulletin 301, System Access Monitor (SAM) Installation and Operation, Apr. 1, 1984.

Primary Examiner—Jin F. Ng
Assistant Examiner—Dwayne D. Bost
Attorney, Agent, or Firm—Augustus G. Douvas

[57] ABSTRACT

A cellular system access monitor for monitoring and reporting information relating to the operation of cellular telephone systems. The monitor features a cellular telephone of current design, responding to the expanded spectrum of 832 channels. The cellular telephone communicates with a controller using a self-clocking data transmission scheme to improve the reporting and displaying of cellular system parameters, such as cellsite control-channel identification numbers and textual cellsite identification information. Additionally, the monitor employs a calibration feature for measuring and displaying accurately signal strength in decibels. System parameters are shown on a bit-mapped display.

4 Claims, 17 Drawing Sheets

CELLULAR SYSTEM ACCESS MONITOR

The present invention relates generally to cellular telephone systems, and more particularly to improved methods and apparatus for monitoring and reporting information relating to the operation of cellular telephone systems.

BACKGROUND OF THE INVENTION

Cellular system access monitors (CSAM) are employed in the prior art to monitor and measure many of the operating characteristics of cellular telephone systems. Cellular systems of recent design have been greatly improved by incorporating enhancements and greater system subscriber capacity; however, cellular system access monitors have not kept pace principally because the cellular telephones which have been designed into those monitors are now outdated and are not capable of fully supporting all of the features of the enhanced systems. For example, there now exist 832 cellular channels in the recently expanded spectrum of a cellular telephone system; but, existing cellular system access monitors are only capable of accessing and monitoring the original 666 channels of the expanded spectrum.

Additionally, these access monitors are not capable of reporting basic information required to accurately assess the performance of the cellular telephone system. In particular, there is no reporting of the cellsite control-channel identification numbers, or textual cellsite identification information. Also due to the outdated nature of the cellular telephones used in the access monitors of the prior art received signal strength is not measured and displayed accurately in decibels calibrated in a manner recognizing the non-linear reception characteristics of a modern cellular telephone. This deficiency in the calibration technique causes erroneous signal amplitude measurements to be taken, and hence reduces the accuracy of the monitoring and reporting function which is a basic operational element in cellular system access monitors.

SUMMARY OF THE INVENTION

Accordingly, it is a principal object of the present invention to provide an improved method and apparatus for a cellular system access monitor (CSAM) that employs the self-clocking data transmission interface embodied in the new cellular telephones for retrieval of the information pertaining to the operation of a cellular telephone system.

It is another object of the present invention to provide an improved CSAM for retrieving and reporting the cellsite control channel identification number for cellsites within a cellular telephone system.

It is a further object of the present invention to provide an improved CSAM for the monitoring of cellular channels in the new expanded spectrum of frequencies.

It is a further object of the present invention to provide an improved CSAM for reporting the cellsite identification number for control channels.

It is a further object of the present invention to provide an improved CSAM for reporting custom cellsite identification information to aid in the recognition of cellsites.

It is a further object of the present invention to provide an improved CSAM for calibrating cellular telephones in 1 dBm increments from −20 to −120 dBm.

It is a further object of the present invention to provide an improved CSAM for the display of cellular system information utilizing a bit-mapped display.

It is a further object of the present invention to provide an improved CSAM for the storage and automatic use of operational configuration parameters.

BRIEF DESCRIPTION OF THE DRAWINGS

In order that all of the structural and functional features for attaining the objects of this cellular system access monitor (CSAM) may be readily understood, detailed reference is herein made to the accompanying drawings, wherein.

BRIEF DESCRIPTION INVENTION

Figure 1:
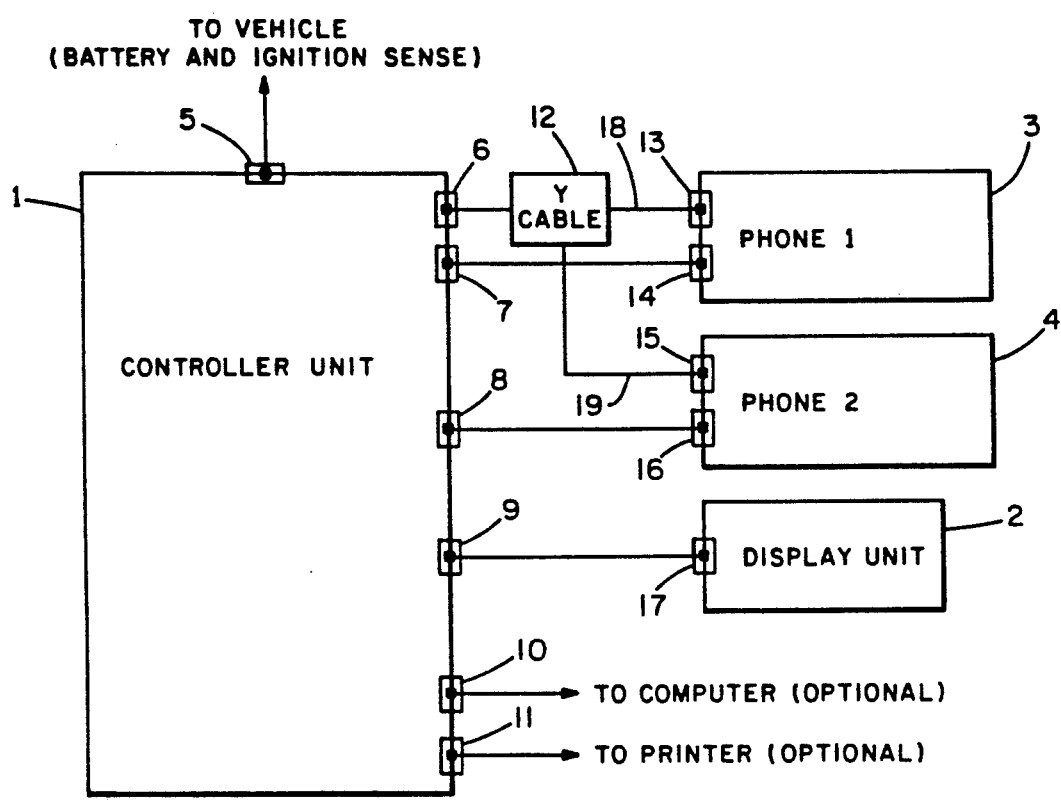
FIG. 1 shows a block diagram of the CSAM.

The cellular system access monitor, hereafter referred to in this document as CSAM, whose block diagram is shown in FIG. 1, is a diagnostic tool for testing the operation of a cellular telephone system. A cellular telephone system is a communications system which supports the transmission and reception of voice and data signals for mobile or portable telephones using the atmosphere as a medium. Cellular telephone systems are initially designed using theoretical models for the propagation of the transmitted radio signals through the atmosphere, but due to both naturally-occurring physical phenomena and man-made structures, these theoretical models do not exactly portray the conditions that exist in the field during actual use of the system. The CSAM is primarily used for the purposes of analyzing the performance of the cellular system as it is actually operating in the field. This analysis can then used to verify the design of the system, fine-tune the actual operation of the system, and locate and assist in the correction of system problems stemming from either natural or man-made causes which could not have been predicted using the theoretical models of the system.

The CSAM is used by installing it into a vehicle which is travelling through the coverage region of a cellular system. Measurements are then taken by the CSAM of the characteristics of the cellular system as the CSAM sees them, which is the same as how a cellular telephone sees them since the CSAM uses actual commerically-available cellular telephones 3 and 4 of FIG. 1 that would normally be used in the cellular system. Therefore, if the CSAM reports measurements which indicate that a problem exists with some aspect of the cellular system operation, it can be realistically assumed that any cellular telephone would also experience the same problem and hence reduce the effectiveness of the system.

The CSAM incorporates many features that aid in the diagnosis and performance analysis of cellular systems. To accomplish a complete and thorough analysis of a cellular system, information pertaining to the operation of the system must first be obtained in both an accurate and reliable manner. The CSAM uses phones 1 and 2 (3 and 4 of FIG. 1) to obtain this information, which includes parameters relating to the operation of the cellular system as a whole and also parameters relating to the operation of the cellular phone in the system.

Feature 1

Figure 2:
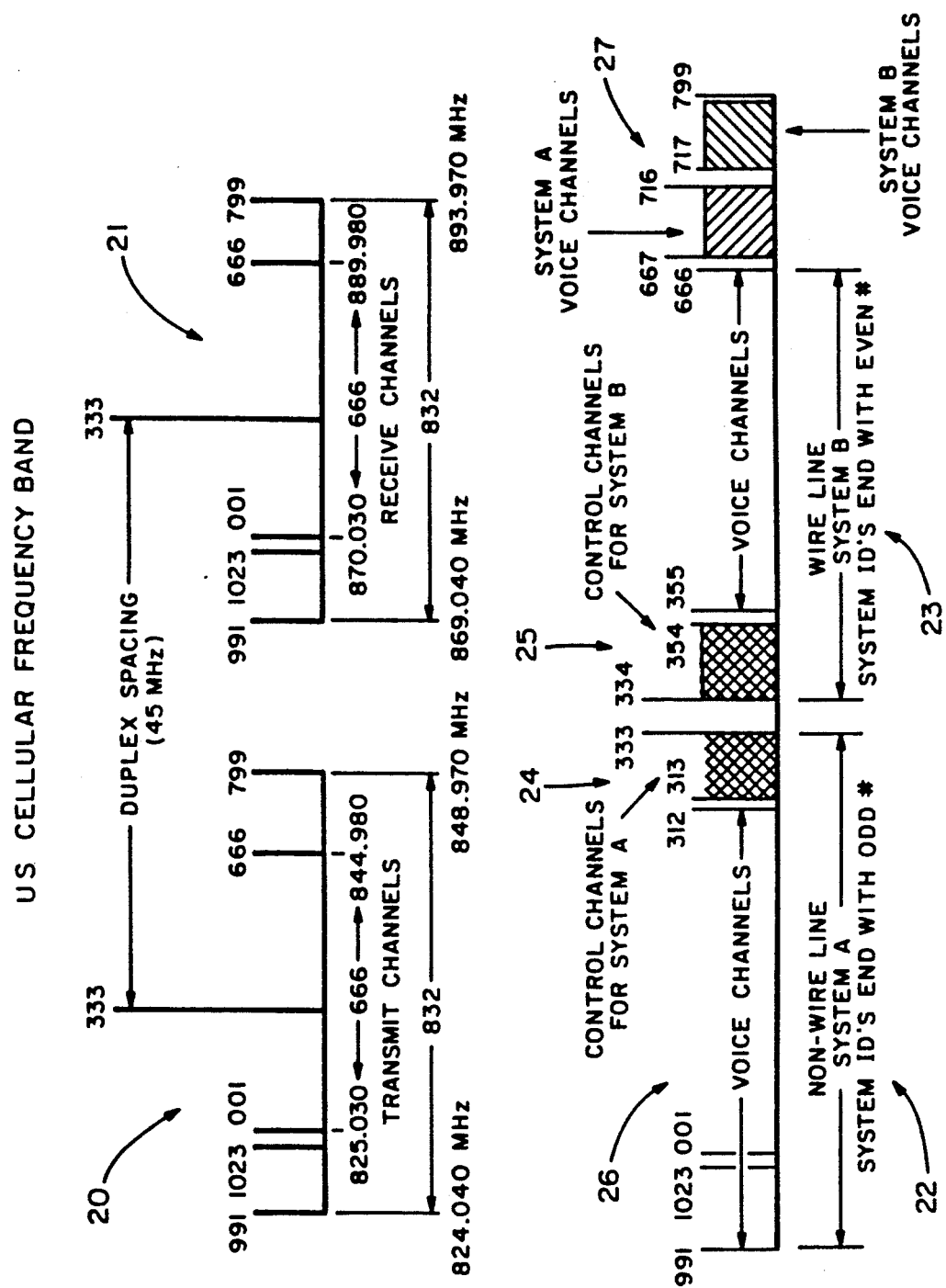
FIG. 2 shows an illustration of the configuration of the channels in the expanded spectrum of 832 channels in a cellular system, detailing the layout of the transmit frequencies (20 of FIG. 2) and receive frequencies (21 of FIG. 2) for each channel, the separation of the channels into the two different subsystems A (22 of FIG. 2) and B (23 of FIG. 2), and the layout of the control channels (24 and 25 of FIG. 2) and voice channels (26 and 27 of FIG. 2) within each of the two subsystems.

Interface to Motorola 6000 Series Cellular Telephone to Retrieve Information Pertaining to the Operation of the Transceiver and of the Cellular System in which it is Operating A first novel feature of this invention relates to the circuitry and programming within the CSAM for interfacing to the Motorola 6000 Series cellular telephones 1 and 2 (3 and 4 of FIG. 1) using the interface protocol outlined in Motorola U.S. Pat. No. 4,369,516. As a primary function, the CSAM continuously monitors the status of phone 1 (3 of FIG. 1) which is known as the call-tracking phone since it is operates as any normal phone operates in the cellular system. The parameters which constitute the status of a phone include the channel that it is currently tuned to, whether or not the channel is a control or a voice channel, the identification number of the cellsite which is using the channel, the amount of attenuation that the phone is using while transmitting to the cellsite, and whether or not the transmit and receive audio are muted. Additionally, there are status parameters which pertain only to control channels, and status parameters which pertain only to voice channels. As shown in FIG. 2, a cellular channel consists of both a transmit and a receive frequency which are separated by 45 MHz. The transmit channel frequencies 20 of FIG. 2 for all of the channels supported in a cellular system are grouped together, as are all of the receive channel frequencies 21 of FIG. 2. Originally, cellular systems were configured to have only 666 different channels, but due to the increase in system use, the number of channels available on the system was increased to the present number of 832. This configuration of 832 channels is commonly referred to as the expanded spectrum due to the addition of the 166 channels.

Feature 2

Monitoring the Entire Expanded Spectrum of 832 Channels

A second novel feature of this invention relates to the circuitry and programming within the CSAM to support the monitoring of the expanded spectrum of channels to be able to monitor and fully analyze the performance of an entire cellular system. The 832 channels in the expanded spectrum are divided into two groups of subsystems of 416 channels each, referred to as subsystem A (22 of FIG. 2) and subsystem B (23 of FIG. 2). These two subsystems represent different providers of cellular service in the same coverage area for competitive reasons. Within each subsystem (22 and 23 of FIG. 2) the 416 channels are further divided into 21 control channels (24 and 25 of FIG. 2) and 395 voice channels (26 and 27 of FIG. 2). The control channels (24 and 25 of FIG. 2) are used by the cellsite to remain in contact with and issue commands to the phone when the phone is not on a call, and the voice channels (26 and 27 of FIG. 2) are used during active calls when the phone is in use. A cellular subsystem consists of many cellsites geographically located throughout an area so as to always provide contact with the cellular phones in all parts of the coverage area. Each cellsite has a group of control and voice channels associated with it, which are different than the group of channels on neighboring cellsites to alleviate the possibility of crosstalk. The channels on all of the cellsites within a subsystem represent all of the 416 channels supported by the subsystem. In addition, each cellsite has associated with it a set of two identification numbers, one number for the control channels and one number for the voice channels. The cellular system access monitors in the prior art are capable of reporting the cellsite identification number for the voice channels, but not the cellsite identification number for the control channels.

Feature 3

Reporting of the Cellsite Identification Number for Control Channels

Accordingly, a third novel feature of this invention relates to the circuitry and programming within the CSAM for reporting the cellsite control channel identification number. This cellsite control channel identification number is commonly referred to by cellular engineers as the Digital Color Code (DCC) which is defined to simply be a number between zero and four, inclusive.

The voice channel identification number is commonly referred to by cellular engineers as the Supervisory Audio Tone (SAT) which is simply defined to be a number between zero and three, inclusive. These identification numbers along with the specific group of channels that a cellsite uses uniquely identifies a cellsite. If one cellsite uses the same control channel that is being used by a neighboring cellsite, for example, then each cellsite would be given a different DCC number for control channels. Similarly, neighboring cellsites would each be given a different SAT number if they both used the same voice channel. Since the DCC and SAT parameters are very important in the performance of the cellular system, the CSAM reports these parameters as part of the status of the phone.

To uniquely identify a cellsite within a particular region of a cellular system, a channel number and corresponding DCC or SAT number need to be known. The cellular system access monitors in the prior art were only capable of reporting the channel number, and SAT number if on a voice channel, but were not capable of reporting any further identification of the cellsite which is using the channel.

Feature 4

Reporting of Custom Cellsite Identification Information

Accordingly, a fourth novel feature of this invention relates to the circuitry and programming within the CSAM for reporting textual information which corresponds to and identifies specific cellsites based upon a set of channel and corresponding SAT or DCC numbers. This feature greatly aids the user in identifying the cellsite which is using the channel that phone 1 (3 of FIG. 1) is tuned to. The cellsite identification information can be any combination of alphanumeric characters including spaces, and the CSAM supports cellsite identification information for every possible combination of channel and SAT or DCC values which exist in the entire cellular expanded spectrum system.

Another important function that the CSAM performs is to measure the strength of the signal being received by the phone which was transmitted by a cellsite. The received signal strength measurement is commonly referred to by cellular engineers as the Received Signal Strength Indicator (RSSI), and can be expressed using many units of measurement. It is the sole function of phone 2 (4 of FIG. 1) to continuously tune to different channels and measure the RSSI of the channel. This feature provides the ability to determine the strength of the signal which would be received by a phone operating in a cellular system on any channel at any location in the field. This diagnostic function is especially useful in diagnosing problems where cellular phones are losing contact with cellsites in the system due to low signal strengths. This type of problem removes the ability of the phone to place or receive phone calls, which is a major problem for a communications system. Phone 2 (4 of FIG. 1) continuously measures the signal strengths of the primary channel and of the upper and lower channels that are immediately adjacent to the primary channel with respect to frequency. The primary channel is defined as the channel that phone 1 (3 of FIG. 1) is tuned to. As an added feature, the CSAM also allows the capability to measure the signal strengths of any two channels in the expanded spectrum which are specified by the user. The CSAM continuously retrieves these signal strength readings from phone 2 (4 of FIG. 1) and displays a representation of the readings on the display unit 2 of FIG. 1. The adjacent channel signal strength measurements are represented as a Carrier-to-Interference (C/I) ratio which is obtained by subtracting their signal strengths from the signal strength of the primary channel. The signal strength measurements of the two user-defined channels are also represented in a similar way by subtracting the measurement of one of the channels, known as the desired channel, from the measurement of the other channel, known as the undesired channel.

All of the aforementioned RSSI measurements which are used and reported by the CSAM are expressed in dBm units, which is an absolute measurement defined as a decibel (dB) unit normalized to one millivolt. These dBm units are used since they are standard absolute quantities which are independent of the type of system which is reporting the measurements. The phones 1 and 2 (3 and 4 of FIG. 1) are the components in the CSAM which are used to measure the RSSI, but the phones report the RSSI in measurement units which are specific to the phone and not the same as standard dBm units. A translation procedure is therefore necessary to convert the RSSI units reported by the phone into dBm units which are of more interest for diagnostic and analysis purposes. To properly translate the RSSI units being reported by the phones into the correct dBm units, a calibration procedure is also required. A calibration procedure consists of using a signal generator source to provide a signal with a known strength in dBm units to a cellular system access monitor, and then adjusting the cellular system access monitor to report the correct signal strength in dBm units. The cellular system access monitors in the prior art are capable of being calibrated to some extent, but are not capable of being calibrated in 1 dBm increments in the entire range of −20 to −120 dBm.

Feature 5

Calibration of Cellular Telephones in 1 dBm Increments from −20 to −120 dBm

Accordingly, a fifth novel feature of this invention relates to the circuitry and programming within the CSAM for calibrating phones 1 and 2 (3 and 4 of FIG. 1) in 1 dBm increments in the range from −20 to −120 dBm. Each cellular phone has a different calibration profile, which means that all phones will not report the same RSSI value for a given input dBm value, so therefore each phone must be calibrated before use. The calibration profile for both phones 1 and 2 (3 and 4 of FIG. 1) can be reported to both the computer (10 of FIG. 1) and printer (11 of FIG. 1) ports.

All of the information which is retrieved by the CSAM from the phones 1 and 2 (3 and 4 of FIG. 1) can be reported to both the computer (10 of FIG. 1) and printer (11 of FIG. 1) ports to the optional devices which may connected. The information which is reported includes the status of phone 1 (3 of FIG. 1) and the C/I measurements of the adjacent and user-defined channels. To further aid in the diagnosis of specific problems, the CSAM supports the reporting of this information using the following four different types of "triggers": time, channel handoff, attenuation change, and signal strength level. The time report trigger will cause the status of phone 1 (3 of FIG. 3) to be reported at the time interval specified by the user. Additionally, this is the only report trigger which will enable the reporting of the adjacent and user-defined channel C/I data. The channel handoff report trigger will cause the status of phone 1 (3 of FIG. 2) to be reported when the channel changes that phone 1 is tuned to. Both the status of phone 1 (3 of FIG. 1) BEFORE and AFTER the channel changed will be reported to further aid in the diagnosis of why the channel handoff occurred. The attenuation change report trigger will cause the status of phone 1 (3 of FIG. 2) to be reported when the transmission attenuation changes that phone 1 (3 of FIG. 1) is using. Both the status of phone 1 (3 of FIG. 1) BEFORE and AFTER the attenuation changed will be reported to further aid in the diagnosis of why the attenuation change occurred, which is most likely due to varying distance from a cellsite. The signal strength level report trigger, also known as the event threshold trigger, causes the status of phone 1 (3 of FIG. 1) to be reported whenever the signal strength (in dBm units) of the primary phone channel falls below the level (or threshold) set by the user. If the signal strength of the primary phone channel is consistently below the set threshold, then the maximum rate at which the status of phone 1 (3 of FIG. 1) will be reported is the same as the time interval which has been set for the time report trigger.

Another important scheme used to report the information retrieved by the CSAM concerning the operation of the cellular system is to show the information on the display unit (2 of FIG. 1). The cellular system access monitors in the prior art displayed this information using standard displays which did not support the ability to illustrate the information in any fashion other than using only the letters and numbers which are built into the display. These letters and numbers, which can also be referred to as alphanumeric characters, were only available to be displayed using one size, and hence the size of the characters could not be used to emphasize the importance of a certain piece of information.

Feature 6

Display of Cellular System Information Utilizing a Graphic Bit-Mapped Display

Figure 3:
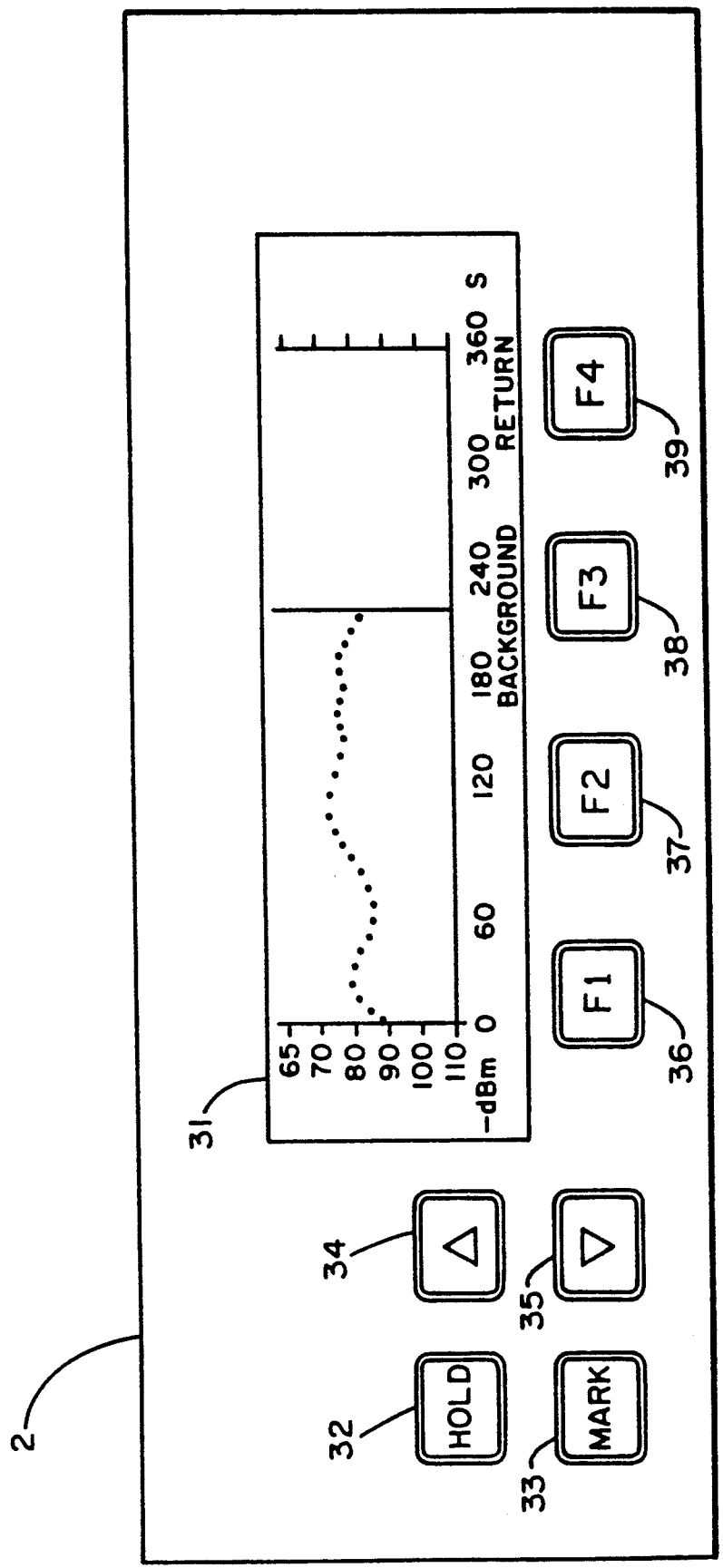
FIG. 3 shows a drawing of the display unit 2 of FIG. 1, illustrating a real-time linear plot of the signal strength of phone 1 which is displayed on the graphic bit-mapped display screen.

Accordingly, a sixth novel feature of this invention relates to the circuitry and programming within the CSAM for displaying the cellular system information using a graphic bit-mapped display. This graphic bit-mapped display supports not only the use of alphanumeric characters to show information, but also the ability to show the information in any other conceivable format. As an example, the CSAM can display a graph as illustrated in FIG. 3 showing the signal strength of phone 1 plotted with respect to time. In this graphic representation of the signal strength of phone 1, the data can more easily be analyzed and interpreted since the current signal strength measurement is shown along with all preceding measurements on the same scale. As an example of an application of this graphic representation of data, the relative changes in signal strength over time can be easily observed to aid in the search for geographic regions where the received signal strength is not as expected due to physical or atmospheric interference.

Figure 4:
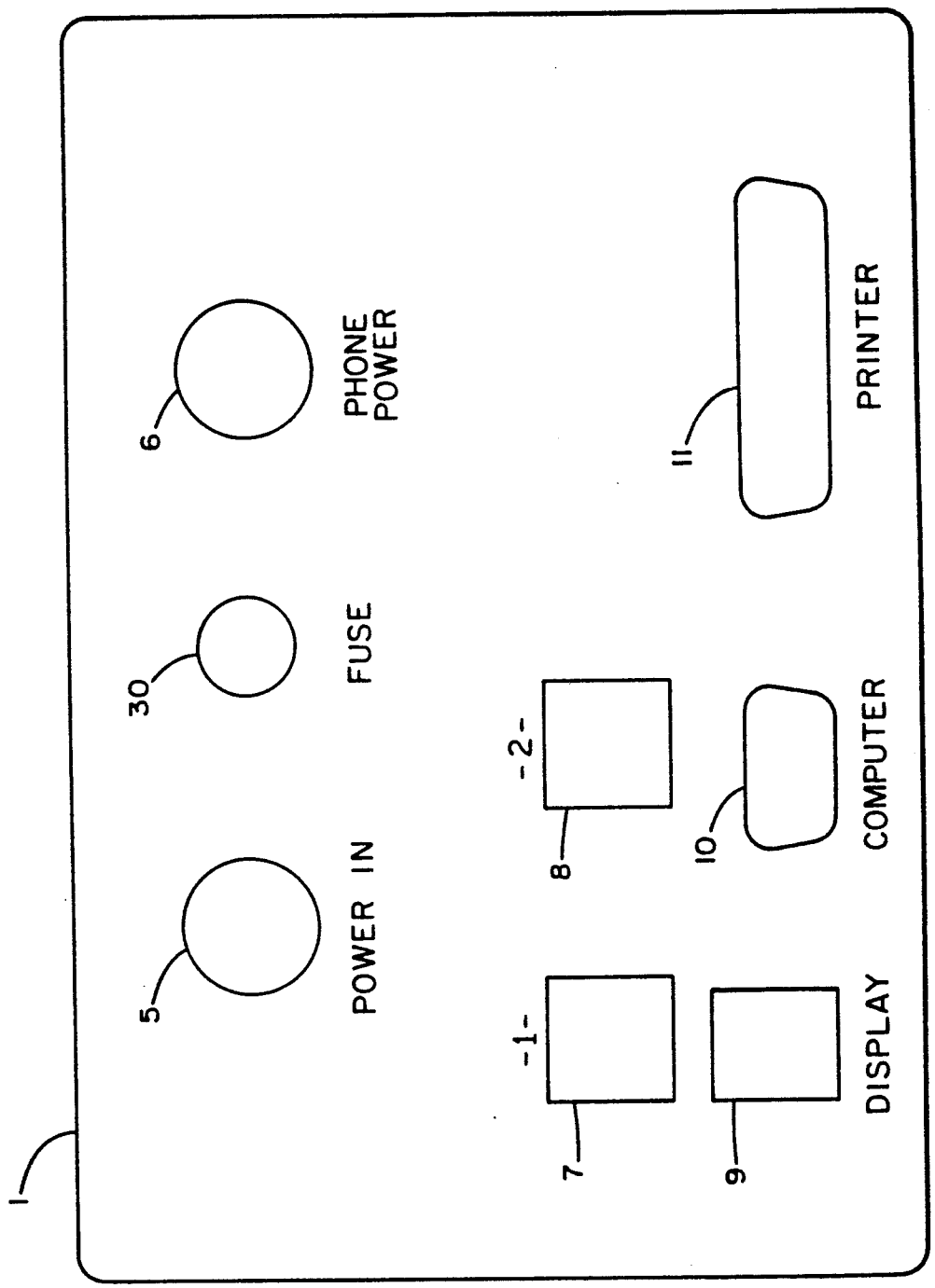
FIG. 4 shows a drawing of the controller unit 1 of FIG. 1.

The CSAM can be configured by the user using the input keys 34-39 of FIG. 3 on the display unit 2 to operate in a variety of ways, depending upon the purpose that the CSAM is being used for. These configuration parameters control functions such as, but not limited to, the reporting of information to the computer port of FIG. 4 and printer port 11, and the display of information on the display unit 2 of FIG. 3. The cellular system access monitors in the prior art are capable of being configured during use, but are not capable of storing the configuration parameters and automatically using the stored parameters the next time that the system is turned on.

Feature 7

Storage and Automatic Use upon Initialization of Operational Configuration Parameters Accordingly, a seventh novel feature of the invention relates to the circuitry and programming within the CSAM for storing the configuration parameters and automatically using these stored parameters the next time that the system is turned on.

DETAILED DESCRIPTION OF THE PREFERRED EMBODIMENT

Referring to the block diagram shown in FIG. 1, the CSAM consists of a controller unit 1, a display unit 2, and two cellular telephones 3 and 4. The controller unit is the component which controls the entire operation of the CSAM, and an illustration appears in FIG. 4 of the physical layout of the front panel of the controller unit showing the connectors 5-11. The display unit 2 of FIG. 1 in the component responsible for showing the information pertaining to the operation of a cellular system and also for the interface to the user of the CSAM using a set of keys. An illustration appears in FIG. 3 of the physical layout of the display unit with its graphic bit-mapped display 31 and keypad input keys 32-39.

Figure 5:
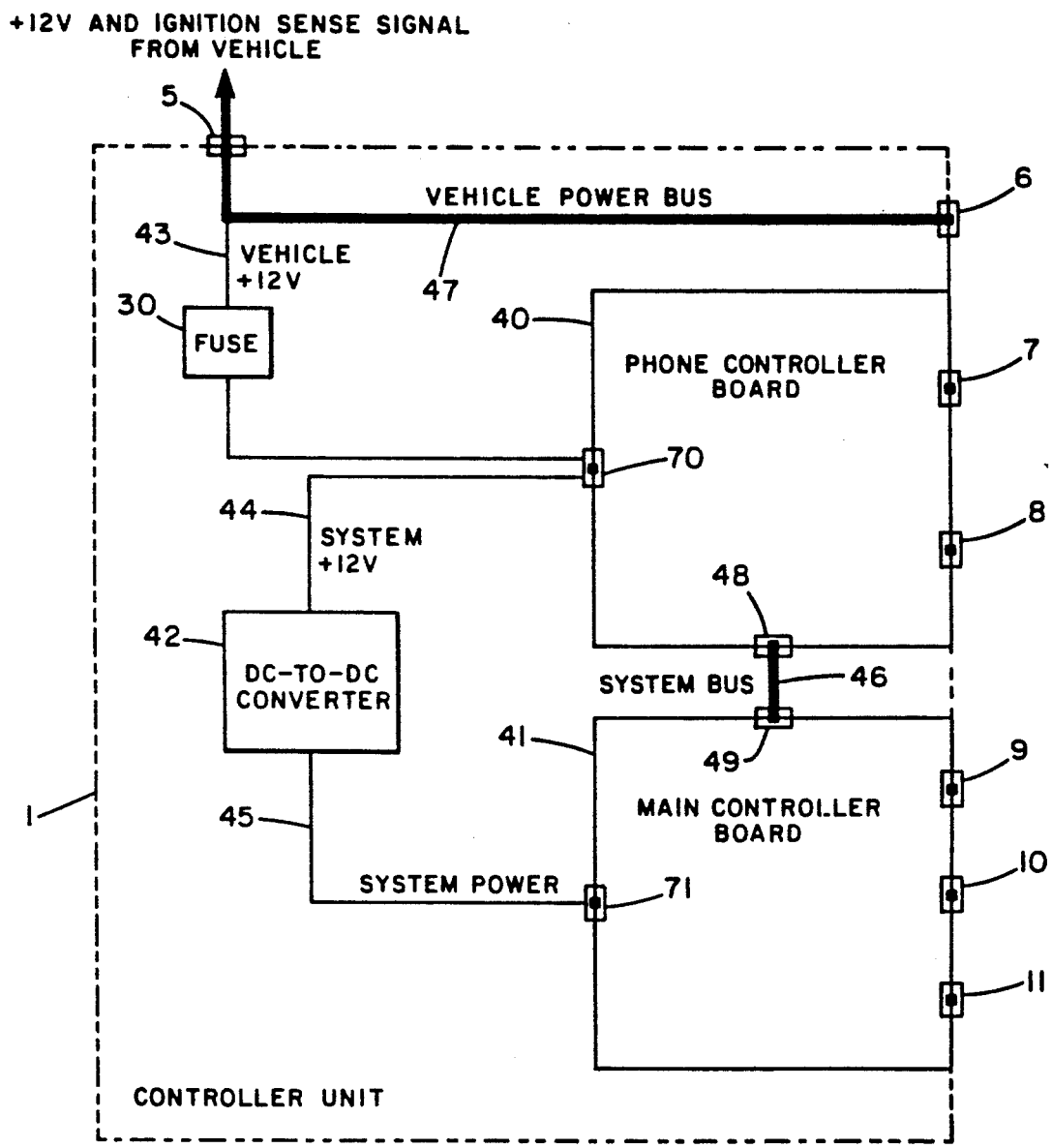
FIG. 5 shows a block diagram of the controller unit 1 of FIG. 1.

FIG. 5 shows a block diagram of the controller unit 1 of FIG. 1, which indicates that it contains a main controller board 41, a phone controller board 40, a DC-to-DC converter 42 and a fuse 30. The main controller board 41 controls the operation of the CSAM, and the phone controller board 40 serves as the interface to the phones 3 and 4 of FIG. 1 using connectors 7 and 8 of FIG. 1. The phone controller board has been designed to interface specifically to cellular phones which support the interface bus protocol outlined in U.S. Pat. No. 4,369,516, and therefore will properly interface to the Motorola Series 6000 cellular telephone since this telephone adheres to the protocol described in the patent. To properly function, the phones 3 and 4 of FIG. 1 require both the power and the ignition sense signal from the vehicle in which they are operating. The ignition sense signal in a vehicle indicates when the vehicle has started, and is used by the phones to detect this event so that they know when to turn on. The controller unit 1 of FIG. 5 provides these signals to the phones via the vehicle power bus 47 of FIG. 5 which is routed in from the vehicle using connector 5. The vehicle power bus 47 exits the controller unit 1 of FIG. 1 through connector 6 and is split by the Y-cable 12 into two identical power buses 18 and 19 which are then routed to the power input connectors 13 and 15 of the phones 3 and 4, respectively. As shown in FIG. 5, the controller unit 1 receives the power that it needs to operate from the vehicle +12 V signal 43 in the vehicle power bus 47. The power signal 43 is routed through fuse 30 to protect the controller unit from surges on the power line, and is then provided to the phone controller board 40 via connector 70. As shown in the block diagram of the phone controller board in FIG. 6, the vehicle +12 V signal 43 is routed to the relay 51 which is controlled by the phone interface circuitry 50. The relay 51 only turns on when the phone interface circuitry 50 detects that phone 1 has turned on by observing the phone 1 bus 53. When the relay turns on, the vehicle +12 V signal 43 is routed through the relay to the system +12 V signal 44 which is routed out the phone controller board 40 via connector 70. As shown in FIG. 5, the system +12 V signal which is provided by the phone controller board 40 goes to the DC-to-DC converter 42 which converts the single +12 V signal into the signals on the system power bus 45 (+5 V and +/−12 V) which are required by the CSAM. After the system power bus 45 enters the main controller board 41 via connector 71, it is then supplied via the system bus 46 to the phone controller board 40 and via the connector 9 to the display unit 2 of FIG. 1.

Figure 6:
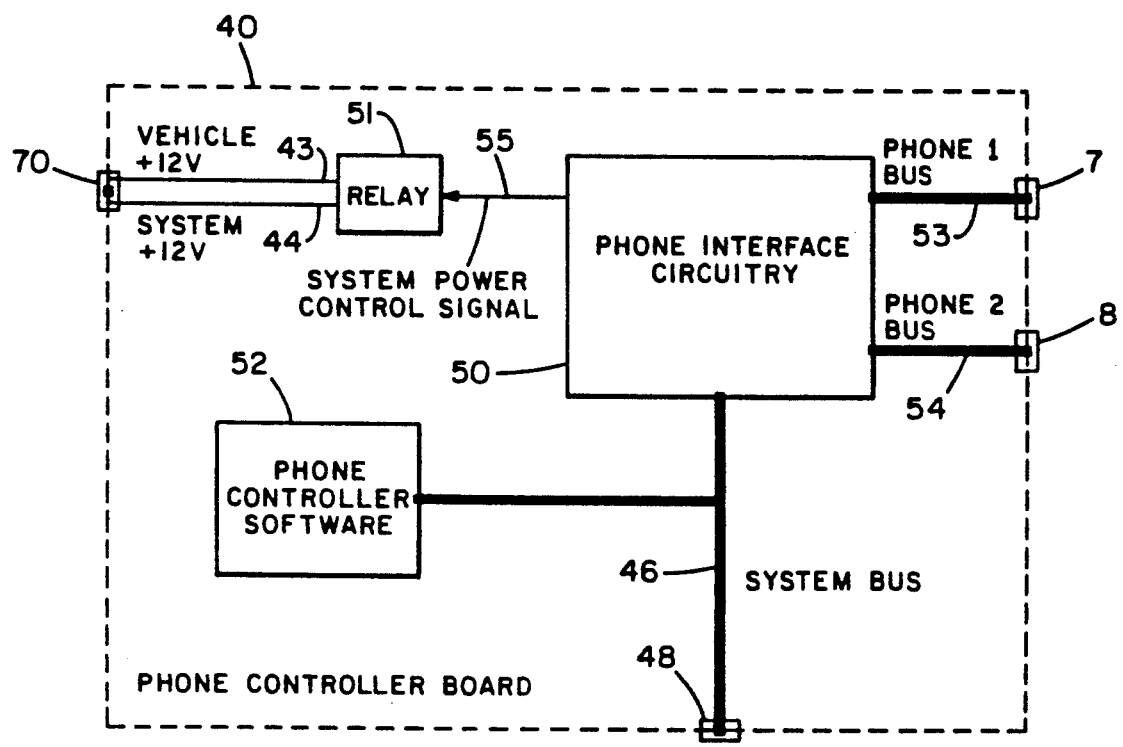
FIG. 6 shows a block diagram of the circuitry on the phone controller board 40 of FIG. 5.
Figure 7:
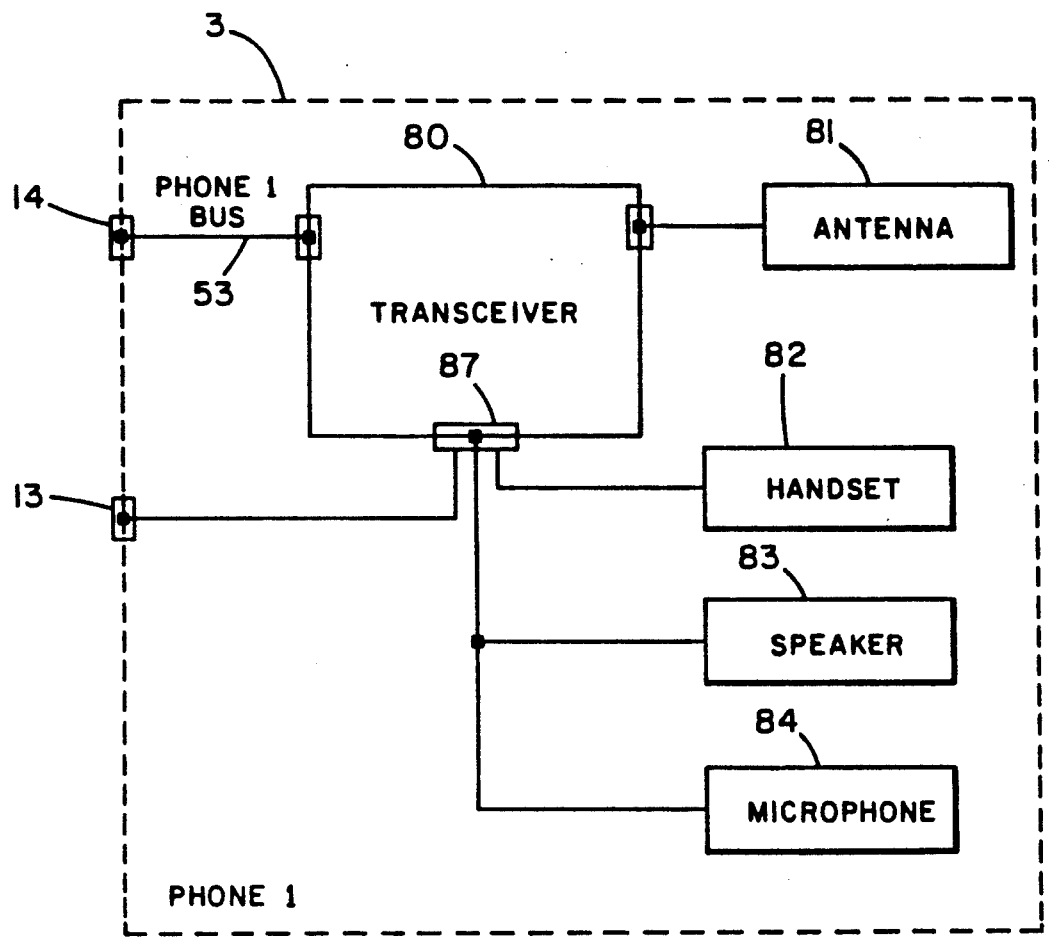
FIG. 7 shows a block diagram of phone 1, 3 of FIG. 1.
Figure 8:
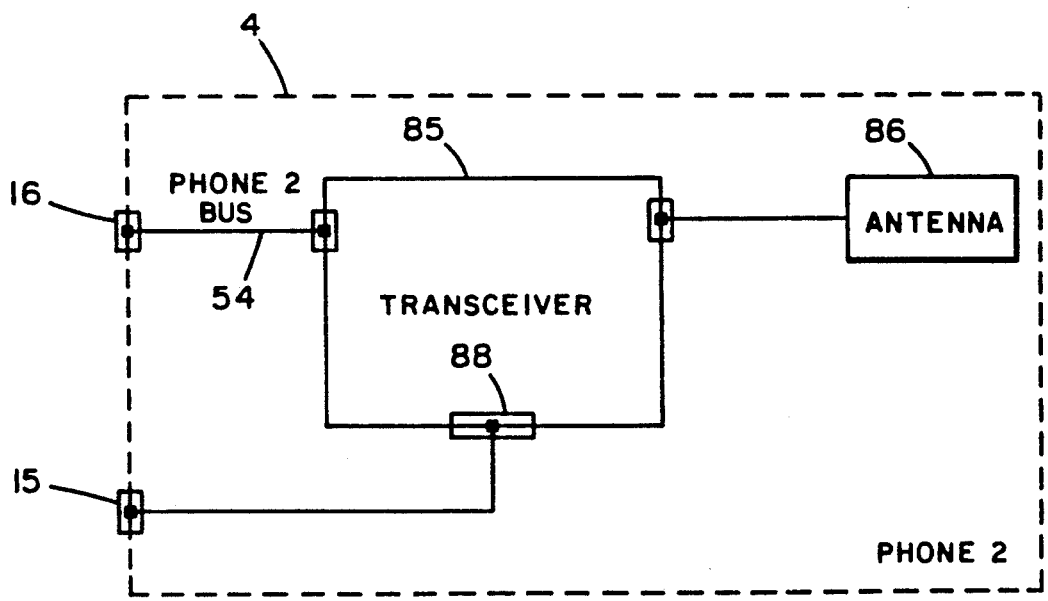
FIG. 8 shows a block diagram of phone 2, 4 of FIG. 1.

As shown in the block diagram in FIG. 6, the phone controller board 40 consists of the relay 51 which controls the system power, the phone interface circuitry 50, and the phone controller board software 52. The phone interface circuitry 50 is responsible for the actual interface to the phones 3 and 4 of FIG. 1. FIGS. 7 and 8 contain block diagrams of the phones 3 and 4 of FIG. 1, to illustrate the components which comprise each phone. As shown in FIG. 7, phone 1 consists of a transceiver 80, antenna 81, handset 82, speaker 83 and microphone 84. The transceiver 80 controls the operation of the phone, the handset 82 contains the interface to the user and is mounted in the cockpit area of the vehicle near the user, and the antenna 81 is used to transmit and receive the cellular radio signals. The speaker 83 and microphone 84 are optional components of the phone, and are used to listen and talk while on a call without the use of the handset. This phone feature is known as "hands-free" operation. The phone receives its power from the connector 13, and communicates using the phone 1 bus (53) through the connector 14. The phone 1 bus 53 which is present on the connector 14 is routed directly to the phone controller board 40 in FIG. 6 via the connector 7. FIG. 1 also illustrates this connection of phone 1 (3) connector 14 to controller unit (1) connector 7. As shown in the block diagram in FIG. 8, phone 2 (4) consists only of the transceiver 85 and an antenna 86 which are identical in operation to the corresponding components in phone 1 shown in FIG. 9. The handset, speaker and microphone are not required for this phone as they are for phone 1, because phone 2 is controlled solely by the phone controller board to retrieve signal strength measurements from desired channels. Phone 2 is therefore not used as a normal cellular phone, but rather as a diagnostic tool. Phone 2 receives its power from connector 15. Phone 2 communicates using phone bus 2 which is routed out of phone 2 via the connector 16, which is in turn connected directly to connector 8 of FIG. 6 on the phone controller board 40. This connection can also be seen in FIG. 1.

Figure 9:
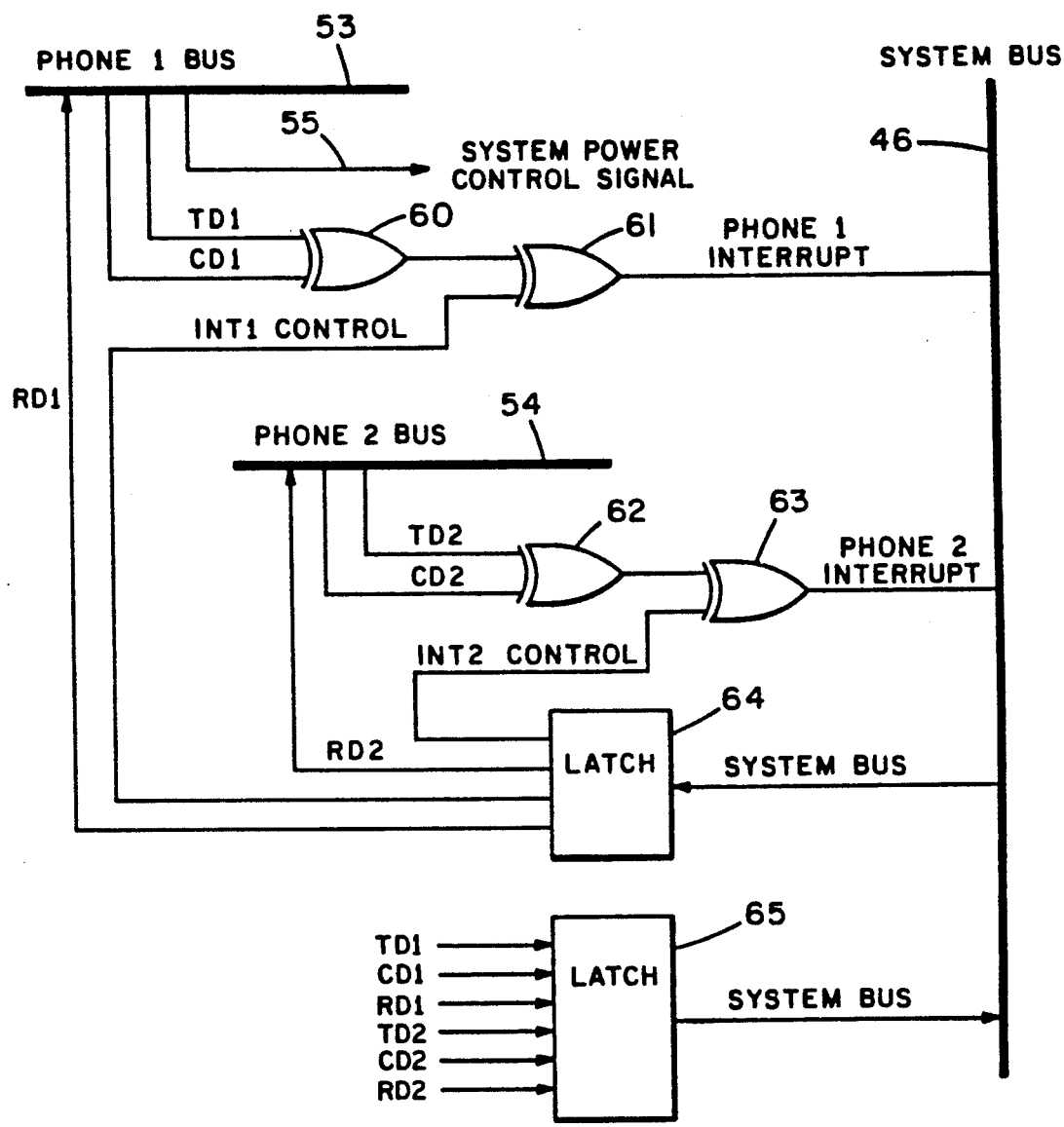
FIG. 9 shows an expanded diagram of the phone interface circuitry 50 of FIG. 6.

The technique that is used by the phone interface circuitry 50 of FIG. 6 to communicate with the phone 1 bus 53 and the phone 2 bus 54 is shown in FIG. 9. The interface circuitry and the technique employed that utilizes the circuitry are the same for both phone interfaces, so only a description of the interface to the phone 1 bus 53 follows. This description applies exactly the same to the interface to the phone 2 bus 54. As stated in U.S. Pat. No. 4,369,516 and repeated here for clarity, the phone 1 bus 53 contains three signals which control the exchange of information on the bus. These three signals are called true data (TD1 of FIG. 9), complement data (CD1), and return data (RD1). The first two signals, TD1, and CD1, are used by phone 1 to send information onto the phone 1 bus. The states of these two signal lines along with the corresponding meaning of each state are set forth hereinbelow in Table I.

TABLE I

| TRUE DATA | COMPLEMENT DATA | TWO-BIT STATE |
|---|---|---|
| 1 | 1 | Word state |
| 0 | 1 | Zero state |
| 1 | 0 | One state |
| 0 | 0 | Bit state |

One bit of data is communicated on the phone 1 bus each time the TD1 and CD1 signals change to either the zero state or the one state, collectively referred to as a data state, with the zero state meaning a data bit of 0 and the one state meaning a data bit of 1. The word and bit states are used during the transmission of data to indicate the time between data bits and to indicate when the transmission has completed. Due to the nature of the protocol on the phone 1 bus, only one of the two signals, TD1 or CD1, can change at a time. The XOR gate 60 is used to detect all changes on the TD1 and CD1 lines. The XOR gate 61 is used to indicate whether the TD1 and CD1 lines have just changed to a data state or if they have just changed to either the word or bit state. The exact function of XOR gate 61 is controlled by the INT1 CONTROL signal which is latched into latch 64 from the SYSTEM BUS 46. After XOR gate 61 activates the PHONE 1 INTERRUPT signal, the SYSTEM BUS 46 then reads the latch 65 which contains the states of all of the signal lines of interest to determine what specific activity on the phone bus has occurred. All three of the signals, TD1, CD1, and RD1, are used to send information onto the phone 1 bus 53 destined for phone 1. Phone 1 will continuously change the states of the TD1 and CD1 lines to clock data onto the phone 1 bus 53. The RD1 line is used by the phone interface circuitry in response to the TD1 and CD1 line clocking to transfer data onto the phone 1 bus. The RD1 line is controlled by writing its value to the latch 64 via the SYSTEM BUS 46, and a new value is written each time that the TD1 and CD1 lines are clocked by phone 1.

Figure 10:
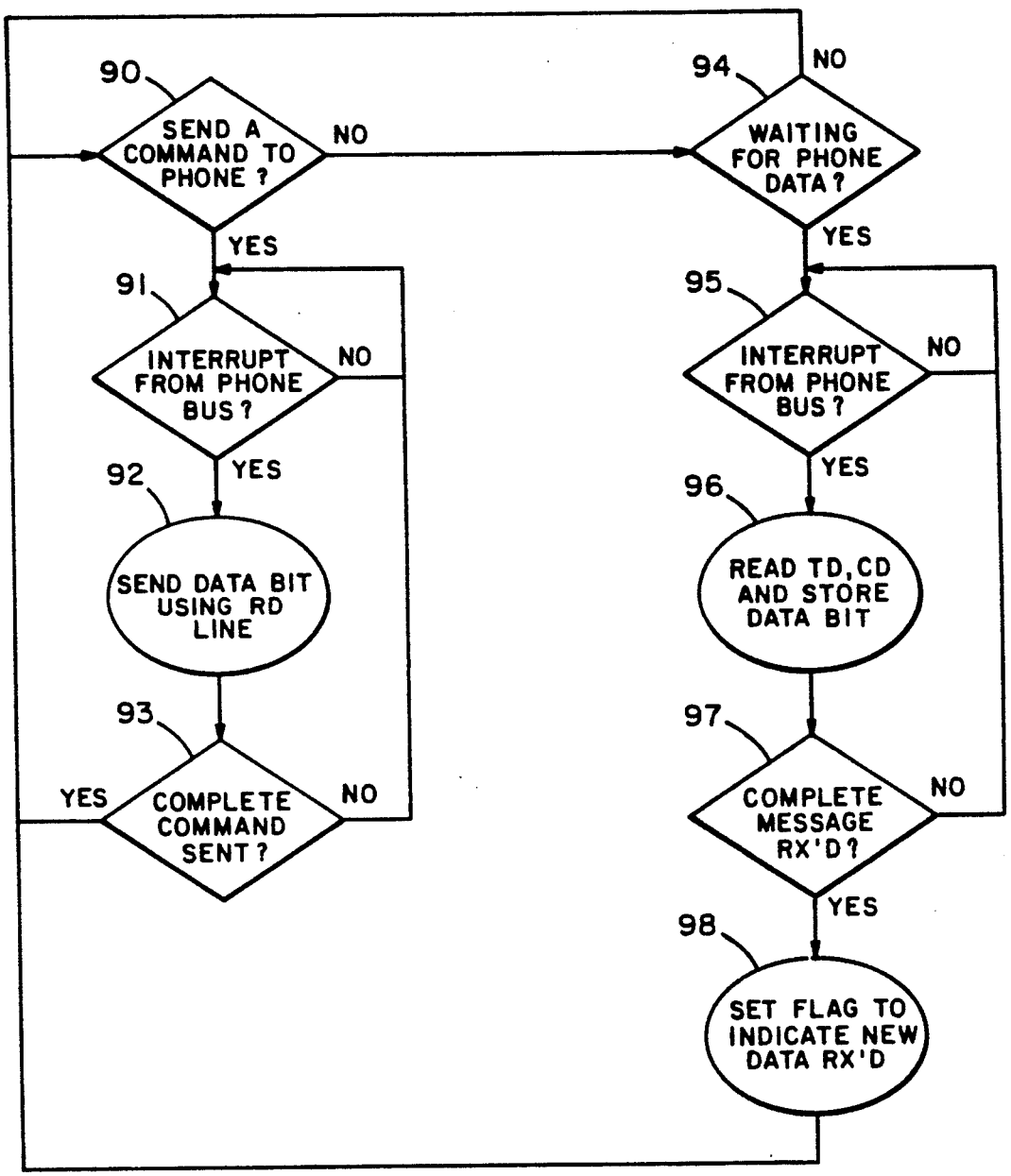
FIG. 10 shows a flowchart for the operation of the phone controller software 52 of FIG. 6.

The phone interface circuitry 50 of FIG. 6 is controlled by the phone controller board software 52, whose basic functional flowchart is shown in FIG. 10. The first basic function of the phone controller board software is to send commands to a phone. As shown in symbol 90 of FIG. 10, if a command is to be sent to a phone, then the software will sequence through symbols 91 to 93 continually waiting for interrupts to occur which will clock the data to be sent onto the phone bus using the RD signal line on the phone bus and the method previously described. Symbols 94–97 illustrate the reception of a data message from the phone bus by waiting for state changes in the TD and CD lines on the phone bus, and then storing the data bits indicated by the state of the signals. When a complete data message has been received from the phone bus, a flag is then set in symbol 98 to inform the software on the main controller board that new phone data is available.

Figure 11:
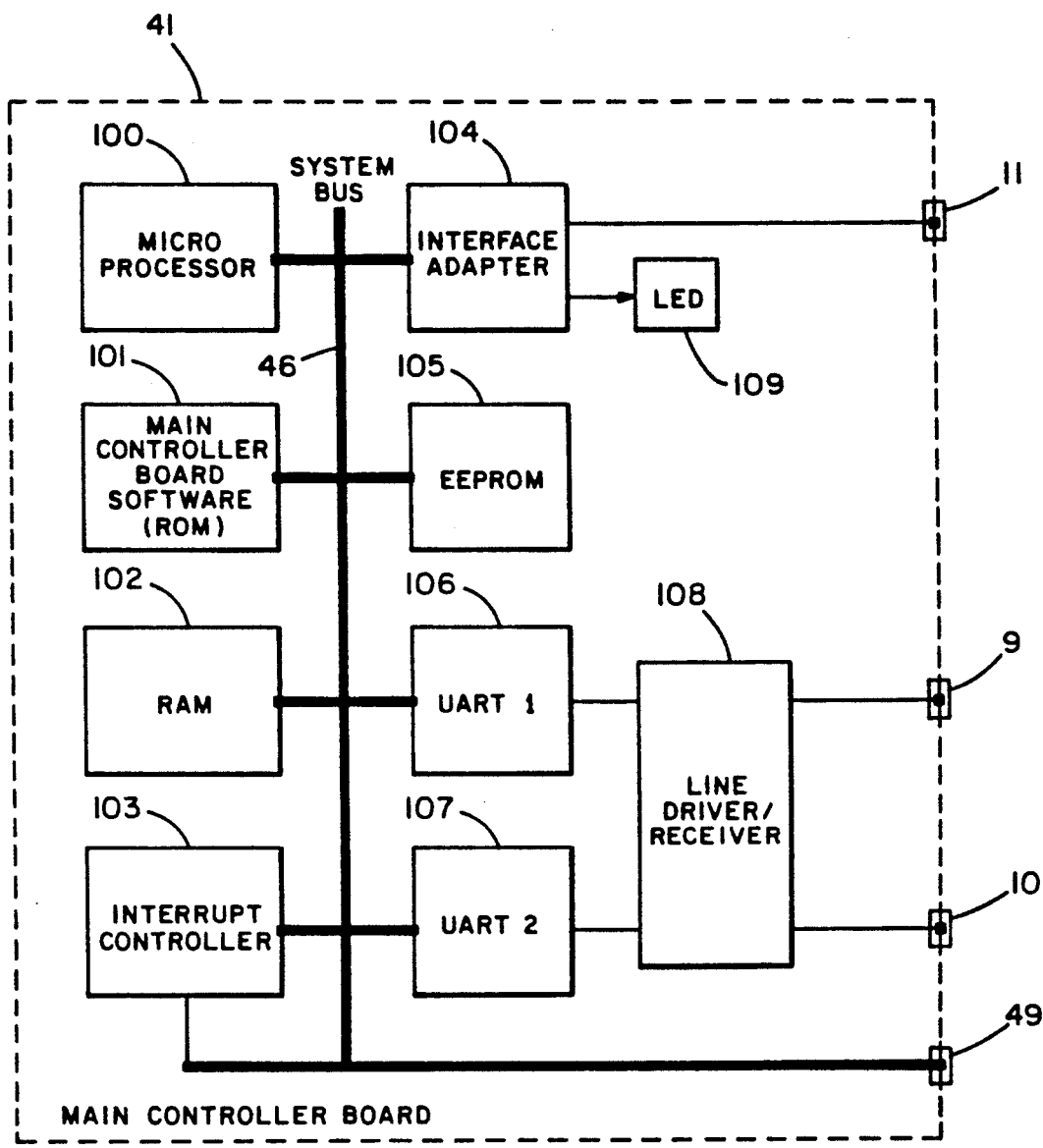
FIG. 11 shows a block diagram of the circuitry on the main controller board 41 of FIG. 5.

FIG. 11 shows the block diagram of the main controller board 41. The microprocessor 100 is the engine which runs the entire CSAM, being instructed what to do by the main controller board software 101 which resides in a ROM on the board. The microprocessor communicates with both the main controller software 101 and the phone controller software 52 of FIG. 6 using the SYSTEM BUS 46. As shown in FIG. 5, the SYSTEM BUS 46 is routed from connector 49 of the main controller board 41 to connector 48 of the phone controller board 40 to access the phone controller board software 52 of FIG. 6. The RAM 102 in FIG. 11 is used for temporary storage of CSAM operational parameters, and EEPROM 105 is used for the permanent storage of both the configuration parameters of the CSAM and of the cellsite identification text. The interrupt controller 103 is responsible for informing the microprocessor 100 of pending service requests by devices such as the phone interface circuitry in FIG. 9. The interface adapter 104 serves as a buffered interface to the optional printer, if attached, via connector 11, and also drives the LED which is used for CSAM development purposes. Both of the universal asynchronous receiver/transmitters (UART) 106 and 107 are responsible for accepting parallel commands from the microprocessor 100 and serially transmitting them to the display unit via connector 9 and to the optional computer, if attached, via connector 10. The line driver/receiver 108 is used to convert the voltage levels of the transmitted and received signals to the proper format for use.

Figure 12:
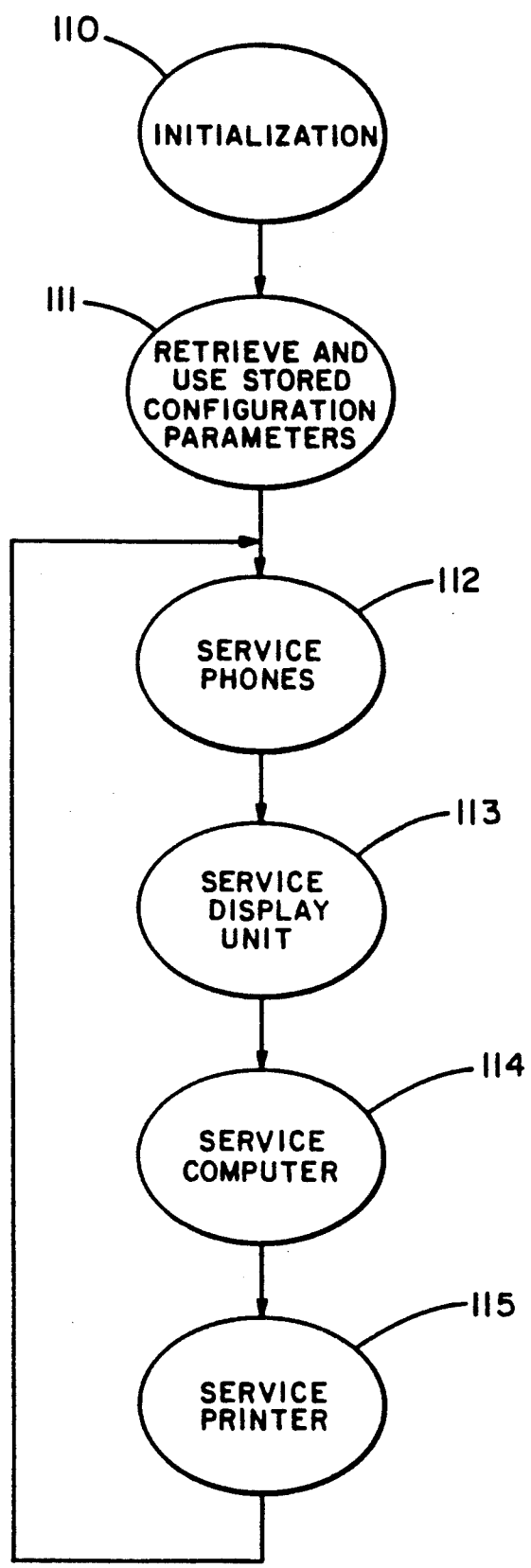
FIG. 12 shows a flowchart for the operation of the main controller software 101 of FIG. 11.

To aid in the understanding of the functions and flow of operation of the CSAM, FIG. 12 shows the basic functional flowchart for the software 101 of FIG. 11 which operates on the main controller board. Upon receiving system power, the software will initialize all of the components in the CSAM as indicated in symbol 110. After initialization, the configuration parameters which have previously been stored will be retrieved from the EEPROM 105 of FIG. 11, and then automatically installed as shown in symbol 111. If no configuration parameters have been previously stored, then a default set of parameters will be used. The EEPROM device is a non-volatile memory which retains information even in the absence of power. This feature allows for the permanent retention of important information which would otherwise have to be re-entered into the CSAM every time that the CSAM turned on. The main loop is then entered consisting of symbols 112-115 which will continually service the requests of the devices operating in the CSAM. The only way to exit this main loop is to remove power from the main controller board by turning off the power to phone 1. Symbol 112 pertains to phones 1 and 2 (3 and 4 of FIG. 1), symbol 113 pertains to the display unit 2, symbol 114 pertains to the optional computer attached at connector 10, and symbol 115 pertains to the optional printer attached at connector 11. Following are discussions for the tasks related to each of the symbols 112-115 which are continuously performed.

Figure 13:
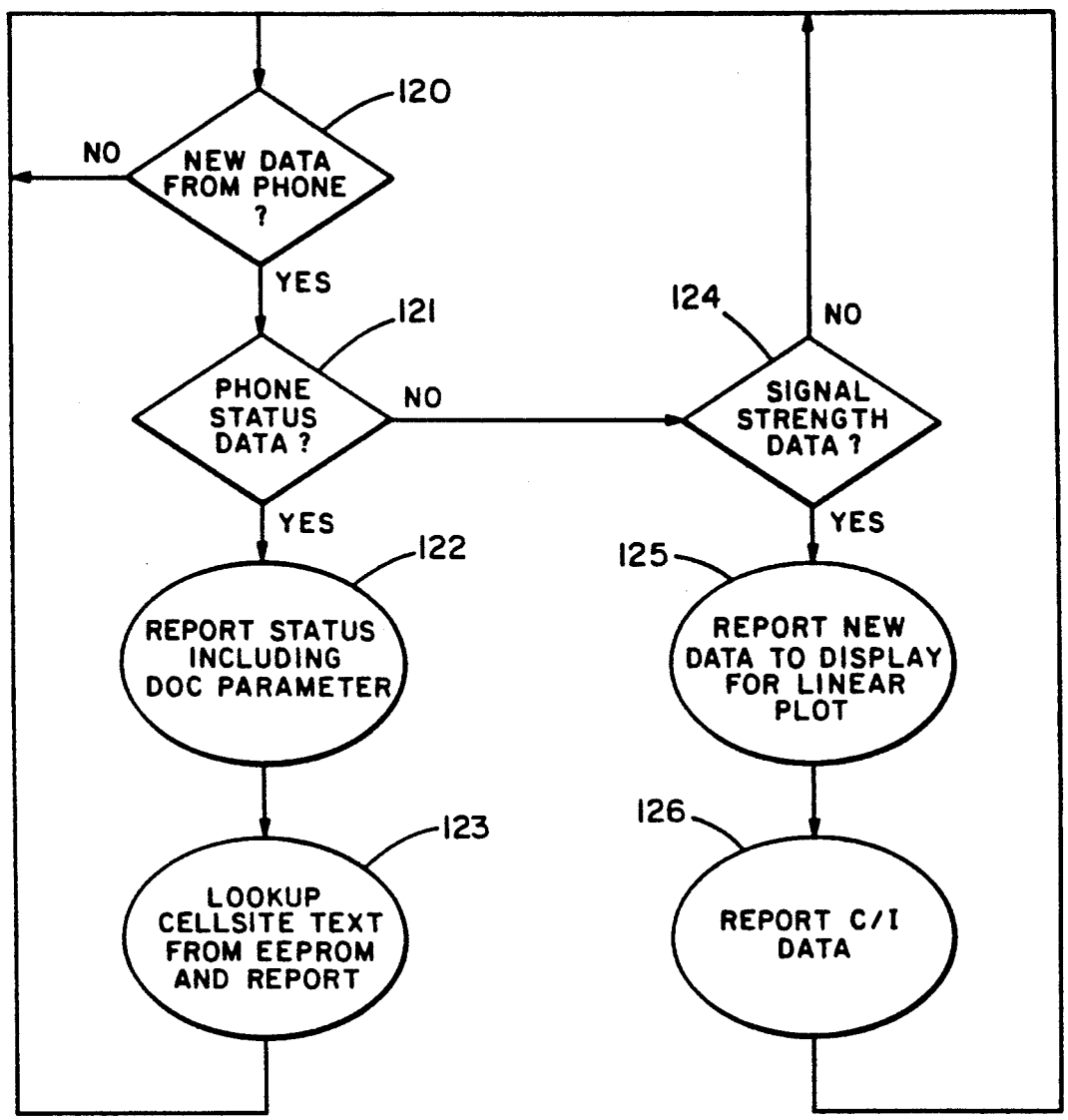
FIG. 13 shows an expanded flowchart for the symbol 112 of FIG. 12.

FIG. 13 is an expansion of the symbol 112 of FIG. 12, and shows the flow of operation for the servicing of the phones. When new phone data has been received for either phone 1 or 2 by the phone controller board which will set a flag to indicate this event, the flow of operation will continue from symbol 120 to symbol 121. If the data from the phone is status data which consists of, among other items, a channel number and DCC or SAT number, the flow will then continue on to symbol 122 which will report all of the status parameters including the DCC parameter. The reporting of information includes sending the information to the display unit, optional computer, and optional printer. Symbol 123 is then entered which retrieves the cellsite identification text corresponding to the channel and SAT or DCC numbers in the new status from the EEPROM 105 of FIG. 11. This cellsite identification text is permanently loaded into the EEPROM during manufacture of the CSAM, and consists of any combination of alphanumeric characters. If at symbol 121 the new phone data received was not status information, then flow continues to symbol 124. If the new phone data is a signal strength measurement, then flow continues to symbol 125; otherwise flow returns to symbol 120 awaiting more phone data. Symbol 125 reports the new signal strength measurement to the display unit for purposes of numeric display and plotting on the linear graph if enabled by the user as shown in FIG. 3. Symbol 126 which is entered next will report the signal strength measurement in a C/I report if this feature has been enabled by the user. One example of a C/I report pertains to adjacent channel analysis. The C/I value is calculated for both the channel that is below and above the primary channel. Control then returns to symbol 120 awaiting more new phone data.

Figure 14:
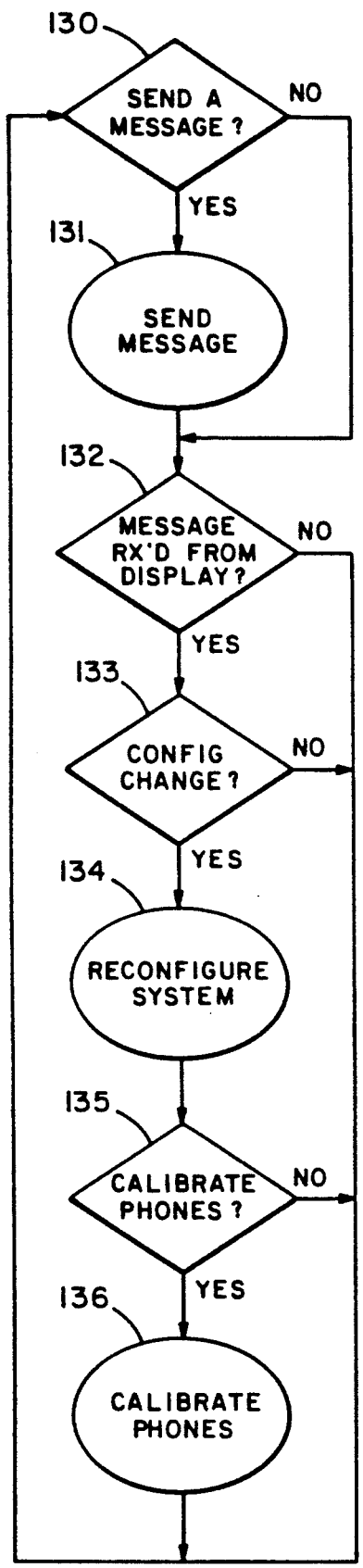
FIG. 14 shows an expanded flowchart for the symbol 113 of FIG. 12.

FIG. 14 is an expanded view of the symbol 113 of FIG. 12, and shows the flow of operation pertaining to the handling of the display unit. Operation begins at symbol 130 and continues to symbol 131 if a message is to be sent to the display unit. Symbol 131 will send the message to the display unit and then continue to symbol 132. In symbol 132, if a message has not been received from the display unit, then flow will continue back to symbol 130. Otherwise, flow will continue to symbol 133 to check if the message from the display unit is requesting a change to the CSAM configuration parameters. If a change has been requested, then the CSAM will be reconfigured in symbol 134 and then flow will continue to symbol 135. If the message from the display unit is requesting the calibration of the phones 1 and 2, then this task will be performed in symbol 136; otherwise, flow will just continue back to symbol 130. The calibration procedure consists of applying an input signal with a known level in dBm to the antenna 81 or 86 of FIG. 8 of either phone 1 or 2 using a radio-frequency (RF) signal generator, and then informing the CSAM of the applied signal level via the keypad of the display unit. The applied signal begins at a level of $-20$ dBm and is decreased incrementally by 1 dBm down to $-120$ dBm.

Figure 15:
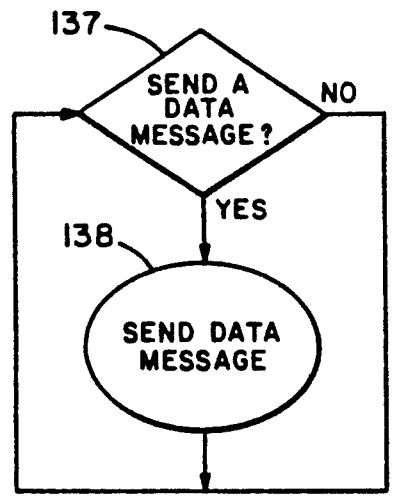
FIG. 15 shows an expanded flowchart for the symbol 114 of FIG. 12.
Figure 16:
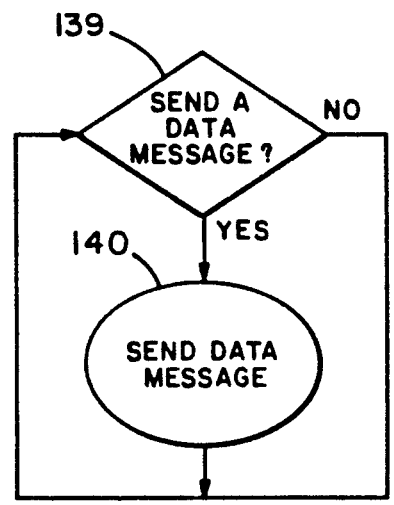
FIG. 16 shows an expanded flowchart for the symbol 115 of FIG. 12.

FIG. 15 is an expanded view of the symbol 114 of FIG. 12, and pertains to the handling of the computer port 10 of FIG. 1. Symbols 137 and 138 are simply used to transmit phone status and C/I data messages out of the port when the messages have been requested to be sent by the main controller board software. FIG. 16 is an expanded view of the symbol 115 of FIG. 12, and pertains to the handling of the printer port 11 of FIG. 1. Symbols 139 and 140 are used in the same fashion as symbols 137 and 138 of FIG. 15 to transmit phone status and C/I data messages out of the port when the messages have been requested to be sent by the main controller board software.

Figure 17:
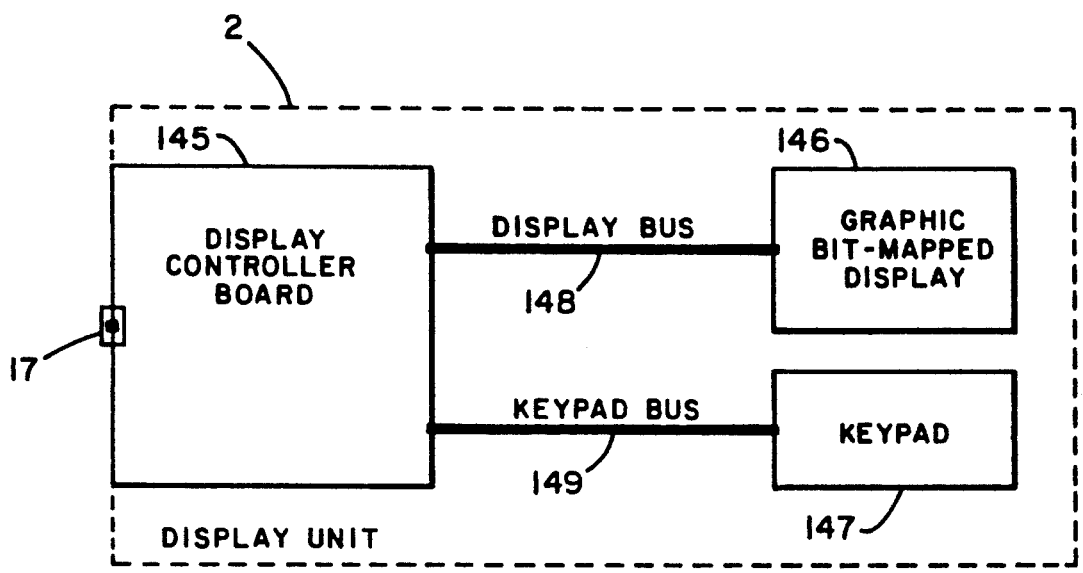
FIG. 17 shows a block diagram of display unit 2 of FIG. 1.
Figure 18:
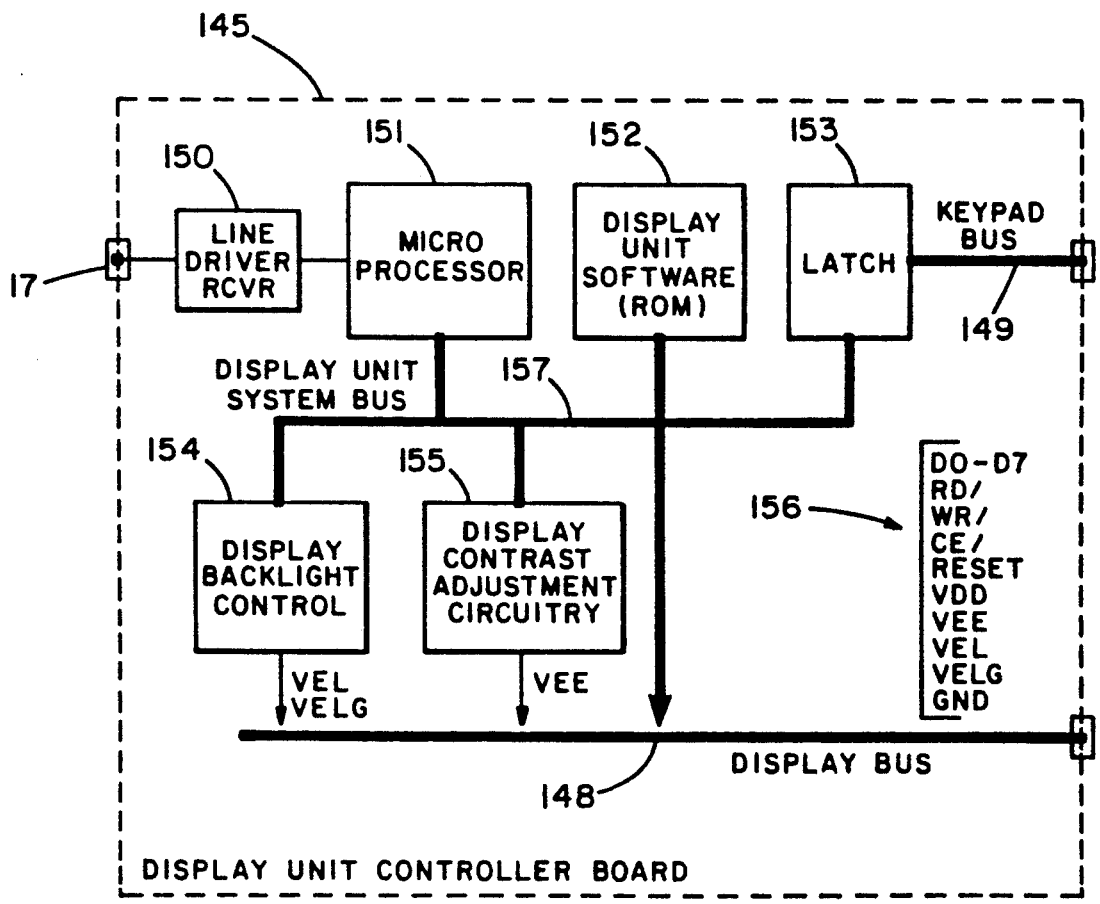
FIG. 18 shows a block diagram for the circuitry on the display controller board 145 of FIG. 17.
Figure 19:
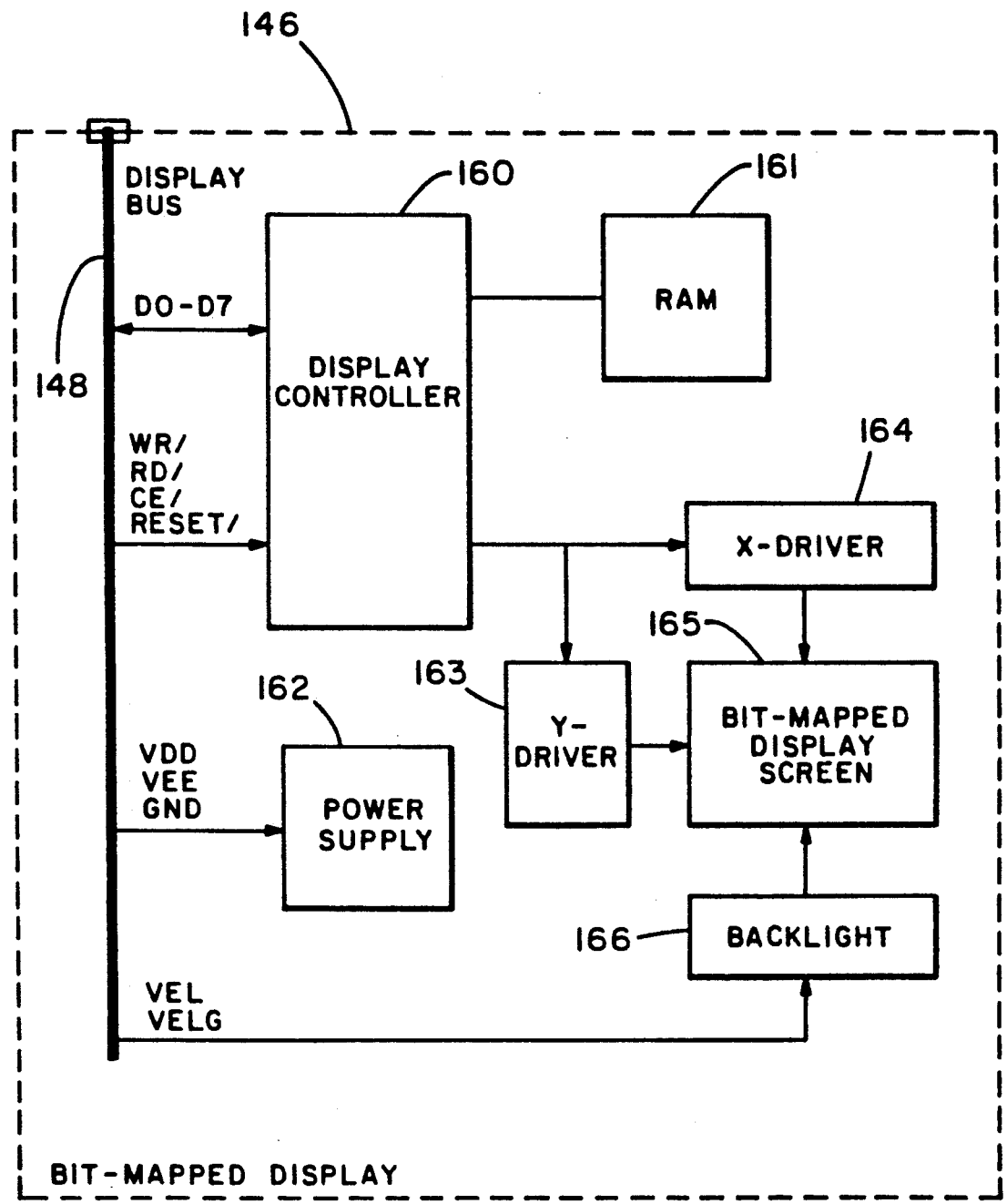
FIG. 19 shows a block diagram of the circuitry on the bit-mapped display 146 of FIG. 17.
Figure 21:
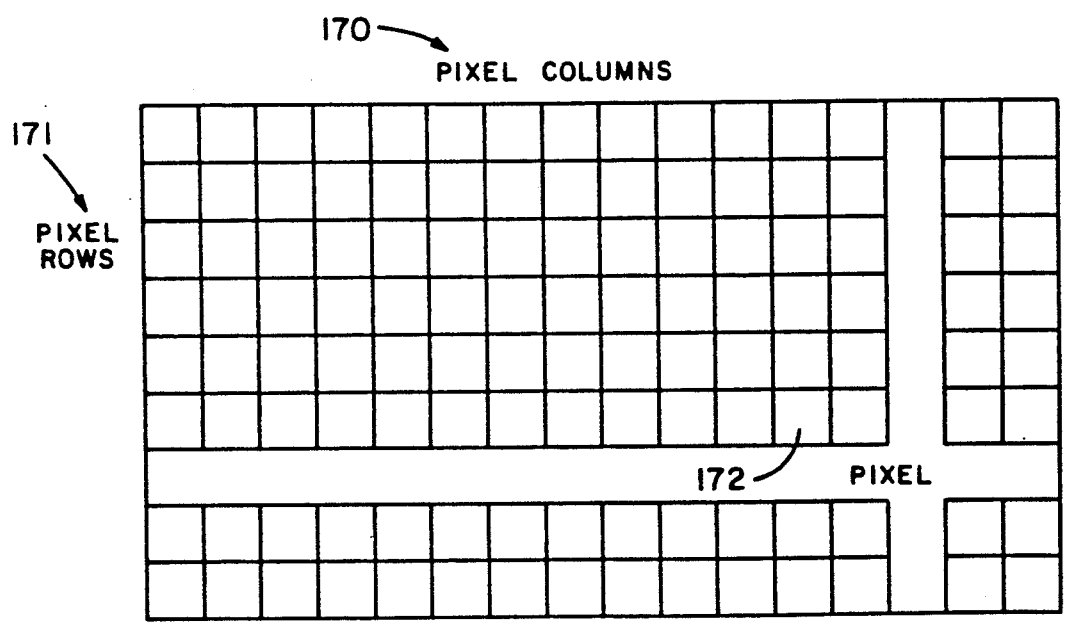
FIG. 21 shows an illustration of the pixel configuration of the graphic bit-mapped display 146 of FIG. 17.
Figure 22:
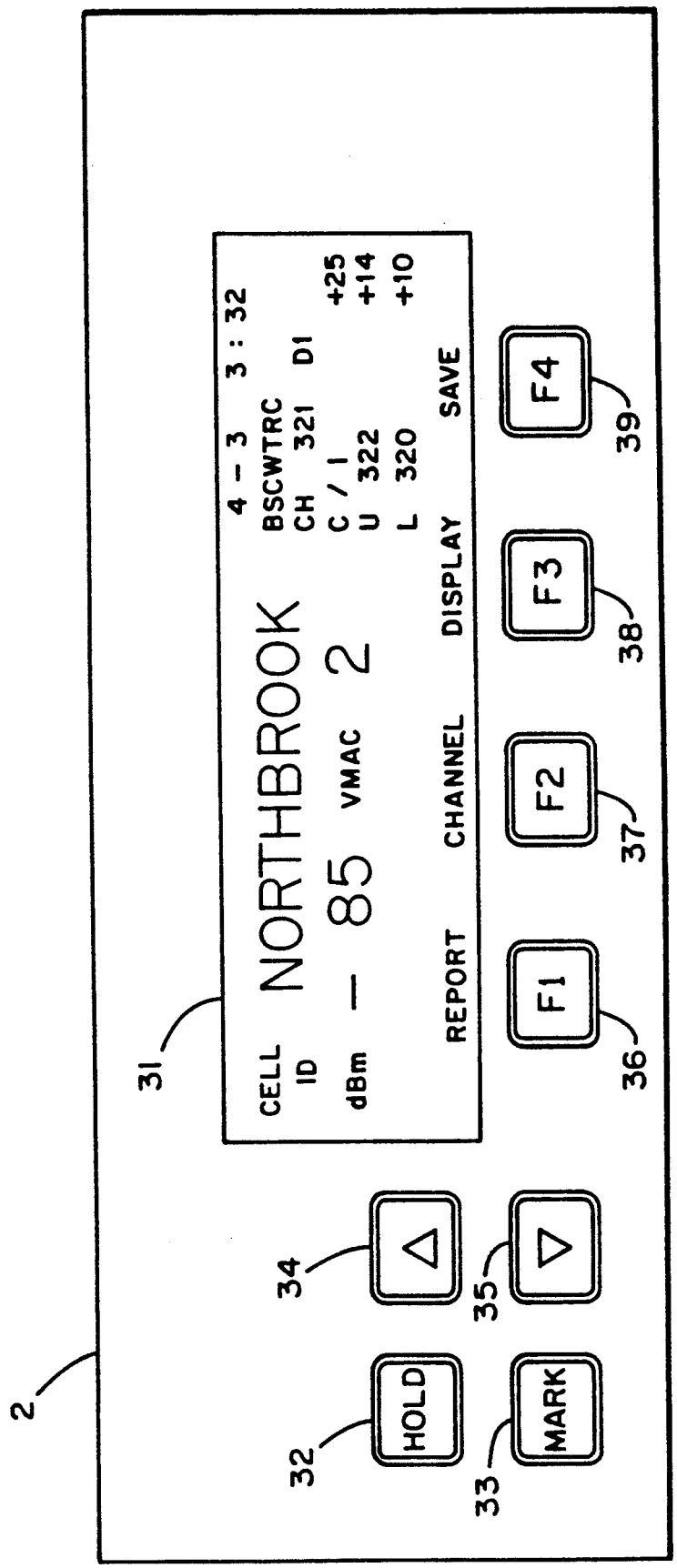
FIG. 22 shows an example of the bit-mapped display 146 of FIG. 17 illustrating enlarged bit-mapped alphanumeric characters.

FIG. 17 shows a block diagram of the display unit 2 of FIG. 1, which indicates that the display unit consists of a display controller board 145, a graphic bit-mapped display 146, and a keypad 147. The display controller board 145 controls the operation of the display unit 2, by configuring the bit-mapped display 146 and accepting input from the keypad 147. The display controller board 145 of FIG. 17 is connected via the connector 17 to the main controller board via connector 9 as shown in FIG. 1. FIG. 18 shows a block diagram of the display controller board 145 of FIG. 17. The microprocessor 151 of FIG. 18 controls the display unit using the software 152 which resides in the ROM. Since the microprocessor 100 of FIG. 11 in the main controller baord 41 uses a line driver/receiver 108, the microprocessor 151 of FIG. 18 must also use a line driver/receiver 150 to properly convert the signals to a voltage level which it understands. The microprocessor 151 does not require the use of a UART as does the microprocessor 100 of FIG. 100 in the main controller board because it contains its own built-in UART. The DISPLAY UNIT SYSTEM BUS 157 of FIG. 18 is used by the microprocessor 151 to communicate with all of the components in the display unit. The latch 153 is used between the DISPLAY UNIT SYSTEM BUS 157 and the KEYPAD BUS 149 to buffer the data from the keypad. The DISPLAY BUS 148 consists of the signals 156 that originate from the DISPLAY UNIT SYSTEM BUS 157, the display backlight control 154 and the display contrast adjustment circuitry 155. The display backlight control 154 supplies the backlight voltage required when the bit-mapped display is desired to be illuminated. The display contrast adjustment circuitry 155 supplies an adjustable voltage to the bit-mapped display to control the contrast. FIG. 19 shows a block diagram of the bit-mapped display 146 of FIG. 17, illustrating the display controller 160 which controls the y-driver 163 and x-driver 164. The y-driver 163 is used to drive each row of the bit-mapped display screen 165, and the x-driver 164 is used to drive each column of the screen. The bit-mapped display screen consists of an array of picture elements, known as pixels, from which characters and figures can be drawn. An illustration of the pixels which comprise the bit-mapped display screen appears in FIG. 21. The specific bit-mapped display that is currently used in the CSAM consists of an array of 64 rows (171 of FIG. 21) and 240 columns (170 of FIG. 21) of pixels (172 of FIG. 21), although an array of any size is supported. Examples of how the bit-mapped display screen can be used to display information in various formats appear in FIGS. 3 and 22. Displays such as the one shown in FIG. 3 are generated by individually turning on pixels within the display screen 31; a task not supported by the displays in the prior art. FIG. 22 illustrates the use of the bit-mapped graphics capability to emphasize certain pieces for information by displaying them in larger letters or numbers. The RAM 161 of FIG. 19 is used to store custom graphic characters for subsequent viewing. These custom characters are formed by specifying which pixels to turn on within a certain area of the display screen. The power supply 162 of the bit-mapped display in FIG. 19 is used to drive the other circuitry in the display, and the backlight 166 is used to illuminate the display screen if desired.

Figure 20:
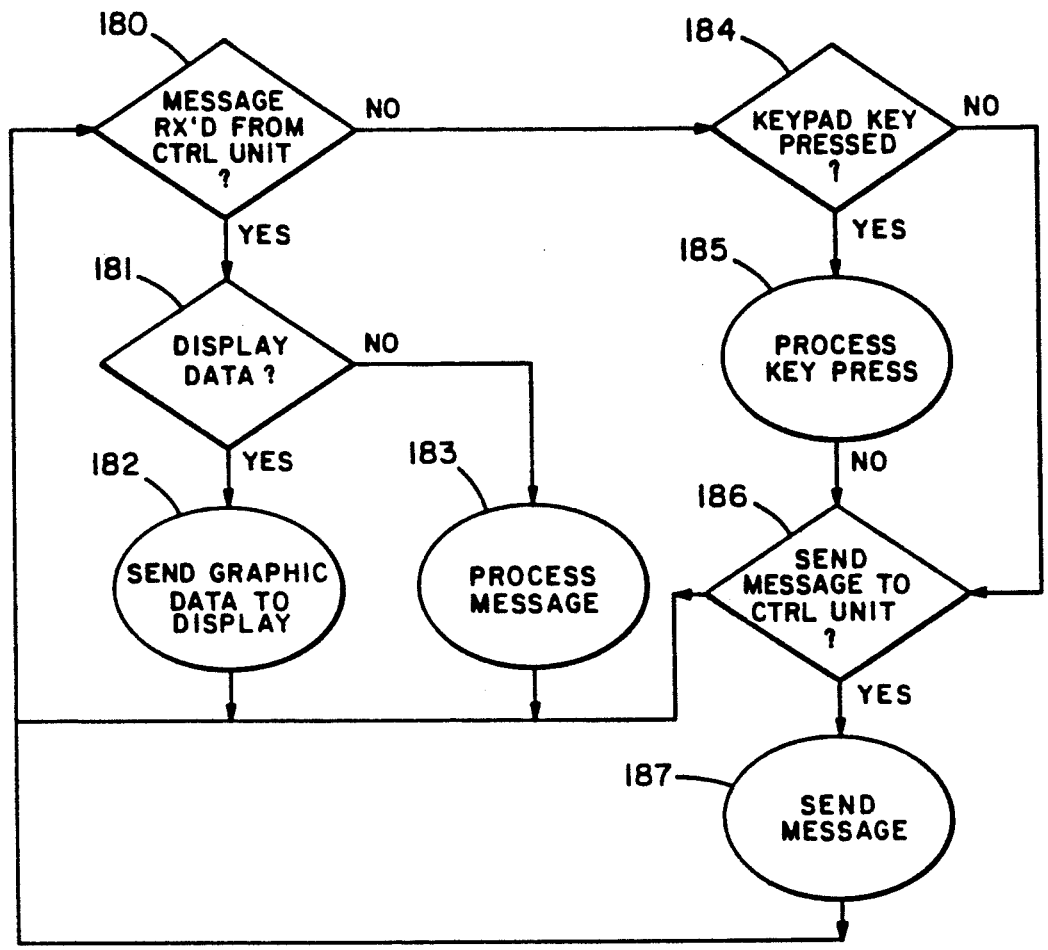
FIG. 20 shows a flowchart for the operation of the display unit software 152 of FIG. 18.

FIG. 20 shows a flowchart for the operation of the disply unit software 152 of FIG. 18, illustrating the main display unit functions of graphically displaying information and accepting input from the keypad. Operation starts in symbol 180 and continues to symbol 181 if a message was received from the controller unit. If the message from the controller unit requests the display of information, then flow continues to symbol 182, where the DISPLAY BUS 148 of FIG. 18 will be used to send information from the microprocessor 151 to the bit-mapped display 146 of FIG. 17. If the message from the controller unit does not request the display of information, but rather for some specific action to occur, then flow continues from symbol 181 to symbol 183, where the message is processed. If a message was not received from the controller unit, then flow would go from symbol 180 to symbol 184, where the microprocessor 151 of FIG. 18 would check the latch 153 to see if a keypad key was pressed on the KEYPAD BUS 149. If a key was pressed flow continues to symbol 185 where the key press will be processed. If in symbol 186 a message is to be sent back to the controller unit to indicate some event related to a key press or error condition, then symbol 187 will be performed next which will send the desired message to the controller unit.

The above described preferred embodiment is merely illustrative of the principles of this invention. Structural and functional modifications can be made without departing from the scope of the invention.

What is claimed is:

1. A combination for calibrating a cellular system access monitor in dBm units to report a received radio-frequency (RF) signal amplitude in dBm units and which signal is transmitted from a cellular system transmitter, comprising a cellular telephone transceiver having an antenna port, a calibrated RF signal source connected to the antenna port for inputting and applying the amplitude of the applied RF signal in discrete dBm steps, a cellular telephone transceiver utilizing a data transmission protocol for reporting an RF input signal amplitude in Received Signal Strength Indicator (RSSI) units emanating from the cellular system transmitter, a controller utilizing the data transmission protocol for continuously retrieving the amplitude in RSSI units of the RF input signal applied to the cellular telephone transceiver from the cellular system transmitter, a communications data bus utilizing the data transmission protocol linking the cellular telephone transceiver and the controller to transfer the amplitude in RSSI units of the RF input signal applied to the cellular telephone transceiver from the cellular system transmitter to the controller, means within the controller for translating the amplitude of the RSSI signal received by the cellular telephone transceiver into discrete dBm steps from the cellular system transmitter, and means connected to the translating means for storing the RSSI and dBm translation.

2. The combination of claim 1 in which the reporting means includes a visual display which is connected to the translating means and in which display the signal amplitude of the RF signal received by the cellular telephone transceiver is displayed in discrete dBm steps.

3. A combination for calibrating a cellular system access monitor in dBm units to report a received radio-frequency (RF) signal amplitude in dBm units and which signal is transmitted from a cellular system transmitter, comprising a cellular telephone transceiver having an antenna port, a calibrated RF signal source connected to the antenna port for inputting and applying the amplitude of the applied RF signal in discrete dBm steps, a cellular telephone transceiver utilizing a data transmission protocol for reporting an RF input signal amplitude in Received Signal Strength Indicator (RSSI) units emanating from the cellular system transmitter, a means utilizing the data transmission protocol for continuously retrieving the amplitude in RSSI units of the RF input signal applied to the cellular telephone transceiver from the cellular system transmitter, a communications data bus utilizing the data transmission protocol linking the cellular telephone transceiver and the utilizing means to transfer the amplitude in RSSI units of the RF input signal applied to the cellular telephone transceiver from the cellular system transmitter to the utilizing means, means for translating the amplitude of the RSSI signal received by the cellular telephone transceiver into discrete dBm steps from the cellular system transmitter, means connected to the translating means for storing the RSSI and dBm translation and means for reporting the dBm translation.

4. The combination of claim 3 in which the reporting means includes a visual display which is connected to the translating means and in which display the signal amplitude of the RF signal received by the cellular telephone transceiver is displayed in discrete dBm steps.

* * * * *